(12) United States Patent
Lai et al.

(10) Patent No.: US 8,495,712 B2
(45) Date of Patent: Jul. 23, 2013

(54) PEER-TO-PEER ACCESS CONTROL METHOD OF TRIPLE UNIT STRUCTURE

(75) Inventors: Xiaolong Lai, Shaanxi (CN); Jun Cao, Shaanxi (CN); Manxia Tie, Shaanxi (CN); Bianling Zhang, Shaanxi (CN)

(73) Assignee: China IWNCOMM Co., Ltd. (CN)

( * ) Notice: Subject to any disclaimer, the term of this patent is extended or adjusted under 35 U.S.C. 154(b) by 454 days.

(21) Appl. No.: 12/519,955

(22) PCT Filed: Jun. 25, 2007

(86) PCT No.: PCT/CN2007/070171
§ 371 (c)(1),
(2), (4) Date: Jun. 18, 2009

(87) PCT Pub. No.: WO2008/074233
PCT Pub. Date: Jun. 26, 2008

(65) Prior Publication Data
US 2010/0037302 A1    Feb. 11, 2010

(30) Foreign Application Priority Data
Dec. 18, 2006 (CN) .......................... 2006 1 0105203

(51) Int. Cl.
*H04L 29/00* (2006.01)
(52) U.S. Cl.
USPC .............................................. 726/5; 713/155
(58) Field of Classification Search
USPC .............................................. 726/5; 713/155
See application file for complete search history.

(56) References Cited

U.S. PATENT DOCUMENTS 7,917,758 B2 * 3/2011 Palekar et al. ............... 713/171
2004/0098612 A1 5/2004 Lee et al.

FOREIGN PATENT DOCUMENTS

| CN | 1399490 A | 2/2003 |
|----|-----------|--------|
| CN | 1426200 A | 6/2003 |
| CN | 1539106 | 10/2004 |
| CN | 1567868 | 1/2005 |

(Continued)

OTHER PUBLICATIONS

Hubert Zimmerman, OSI Reference Model—The ISO Model of Architecture for Open System Interconnection. 1980.*

(Continued)

*Primary Examiner* — Kambiz Zand
*Assistant Examiner* — Ghodrat Jamshidi
(74) *Attorney, Agent, or Firm* — Cantor Colburn LLP (57) ABSTRACT

This invention relates to a peer-to-peer access control method of a triple-unit structure for safely implementing bidirectional authentication between the terminal and the network. According to the method, on the basis of the access control method of the existing double-unit triple-entity structure, the authenticator function is implemented in the access controller, and the authentication protocol function is implemented in the terminal and the access controller, so that the terminal, the access controller and the server all participate in the authentication, and the trust relationship is established between the terminal and the access controller directly, which renders security very reliable. The invention not only solves the technical problems of the access control method of the existing double-unit double-entity structure that the access flexibility is limited and the extension of the number of the access controllers is inconvenient, but also solves the technical problems of the existing access control method of the double-unit triple-entity structure that the process for establishing the trust relationship is complicated and the security of the network may be influenced, thus achieving advantages of high security performance, no requirement of changing existing network structures and relative independency of the authentication protocol.

10 Claims, 3 Drawing Sheets

FOREIGN PATENT DOCUMENTS

| | | |
|---|---|---|
| CN | 1708018 A | 12/2005 |
| CN | 1765082 | 4/2006 |
| EP | 1708447 | 10/2006 |
| WO | 2004015958 A2 | 2/2004 |
| WO | 2004077742 A1 | 9/2004 |

OTHER PUBLICATIONS

Hubert Zimerman, OSI Refecence Model—The ISO model of Architecture for Open Systems Interconnection IEE Transactions on communications, vol. com—28, No. 4 Apr. 1980 pp. 425-432.*

Aboba, B., et al., "Extensible Authentication Protocol (EAP)", Network Working Group, The Internet Society, 2004.

International Search Report PCT/CN2007/070171; Dated Sep. 27, 2007.

* cited by examiner

PEER-TO-PEER ACCESS CONTROL METHOD OF TRIPLE UNIT STRUCTURE

This application claims the priority of Chinese Patent Application No. 200610105203.2, filed on Dec. 18, 2006 with the Chinese Patent Office and titled "Peer-to-Peer Access Control Method of Triple-unit Structure", the contents of which are incorporated herein by reference in their entirety.

FIELD OF THE INVENTION

The present invention relates to a network access control method, and particularly to a peer-to-peer access control method of a triple-unit structure.

BACKGROUND OF THE INVENTION

The basic function of a network is to provide various types of terminals with network services. Although a terminal may be physically connected to a network, the terminal connected to the network is not always an authorized legal terminal, and the network connected by the terminal is not always its required network. Thus, before the terminal communicates with the network, the terminal and the network need authentication and authorization functions to mutually authenticate the legality of the peer party therebetween, i.e. bidirectional access control between the terminal and the network is required, so as to ensure the security of the communication.

Figure 1:
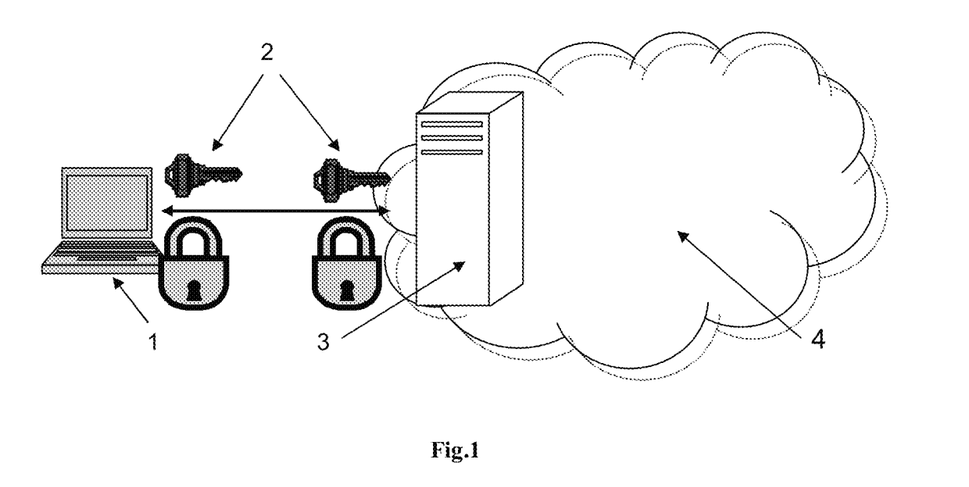
FIG. 1 is a diagram illustrating bidirectional access control between a terminal and a network in the prior art.

FIG. 1 is a diagram illustrating bidirectional access control between a terminal and a network. A terminal 1 accesses a network 4 via an access controller 3, and before the terminal 1 begins to use the resources of the network 4, it is required to complete access control 2 between the terminal 1 and the access controller 3, i.e.:

1. The access controller checks whether the terminal 1 has the right of accessing the network 4, i.e. authenticates the terminal 1; and 2. The terminal 1 checks whether the access controller 3 is a legal device to avoid data being intercepted, i.e. authenticates the network 4.

In the authentication, it is required to use the concepts of entity and unit. Specifically, an entity refers to a functional body which may accomplish a particular function in the network structure and can exist independently, and is typically implemented using an independent device; and a unit refers to a functional body which may have an authentication function in the network access authentication. In the network, the entity is a unit if it has the authentication function; and it is not a unit if it does not have the authentication function.

Figure 2:
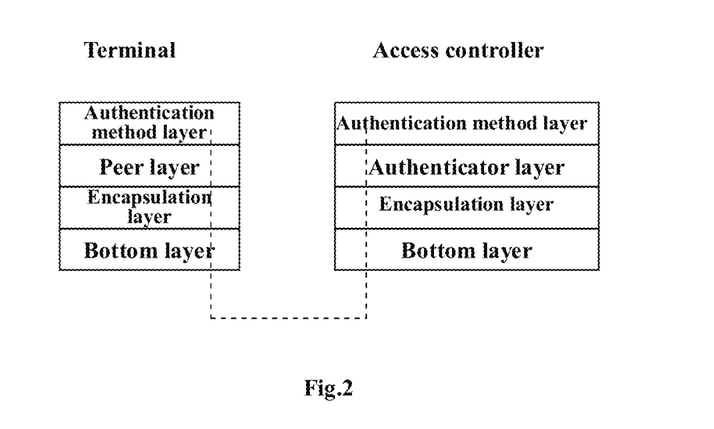
FIG. 2 is a diagram illustrating a connection relationship of a network access control system of a double-unit double-entity structure in the prior art.

Based on the different number of entities which participate in the authentication, there are two types of network structure for implementing the bi-directional authentication between the terminal and the network. RFC3748 Extensible Authentication Protocol (EAP) contains description as follows:

The network structure of the first type is the double-unit double-entity structure as shown in FIG. 2, which includes a terminal and an access controller, where the terminal corresponds to the first entity and the access controller corresponds to the second entity. Specifically, the terminal, corresponding to the first unit, has an authentication credential, an authentication function, and a function for controlling whether to access the network; and the access controller, corresponding to the second unit, has an authentication credential, an authentication function, and a function for controlling the access of the terminal according to the result of the authentication. In this network structure, the terminal and the access controller both have authentication functions, thus supporting bidirectional authentication.

However, there is no authentication server in the double-unit double-entity structure, which leads to significantly limited flexibility. In addition, there are typically a large number of terminals, and if there is also a large number of access controllers, the relationship between the terminals and the access controllers may be many-to-many, and the management may be very difficult. Therefore, the structure of this type is typically used in the case that there is a limited number of access controllers, and the implementation is very limited.

Figure 3:
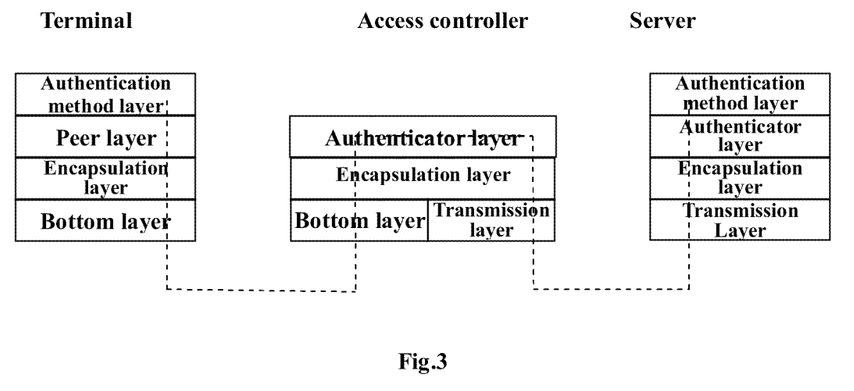
FIG. 3 is a diagram illustrating a connection relationship of a network access control system of a double-unit triple-entity structure in the prior art.

The network structure of the second type is the double-unit triple-entity structure as shown in FIG. 3, which includes a terminal, an access controller and a server, respectively corresponding to the first entity, the second entity and the third entity. Specifically, the terminal, corresponding to the first unit, has an authentication credential, an authentication function, and a function for controlling whether to access the network; the access controller has a function for controlling the access of the terminal according to the result of the authentication, and has no authentication function; and the server, corresponding to the second unit, has an authentication credential and an authentication function. The double-unit triple-entity structure is also called a Pass-through mode. In this network structure, the terminal and the server both have authentication functions, but the access controller has no authentication function, thus the structure of this type supports bidirectional authentication by using the second entity as an intermediate of the third entity.

In the double-unit triple-entity structure, the access controller is virtual. The authentication is only carried out between the terminal and the server, and the relationship with multiple terminals being corresponding to multiple access controllers is evolved into a relationship with multiple terminals being corresponding to a server, i.e. a trust relationship A is established between them. But finally, it is required to establish a trust relationship B between the terminal and the access controller, thus a transfer of the trust relationships, i.e. to transfer from the trust relationship A to the trust relationship B, must be carried out safely. The transfer of the trust relationships is completed by sending a key from the server to the access controller. However, if the key leaks, the security of the network may be significantly influenced. Therefore, in order to avoid this problem, a trust relationship C and a safe channel have to be established between the access controller and the server. Upon reception of the key by the access controller, the terminal and the access controller have to confirm the trust relationship B. Hence, it is required to relay the trust relationships three times to complete the establishment of the trust relationship between the terminal and the access controller. However, to relay the trust relationships multiple times may not only lead to complicated authentication but also influence the security of the network, thus should be avoided.

SUMMARY OF THE INVENTION

The present invention provides a peer-to-peer access control method of a triple-unit structure for safely implementing bidirectional authentication between the terminal and the network, which not only solves the technical problems of the access control method of the existing double-unit double-entity structure that the access flexibility is limited and the extension of the number of the access controllers is inconvenient, but also solves the technical problems of the existing access control method of the double-unit triple-entity structure that the process for establishing the trust relationship is complicated and the security of the network may be influenced.

A technical solution of the present invention may include:

A peer-to-peer access control method of a triple-unit structure, which includes:

implementing, in a subject, a subject function; implementing, in an authenticator, an authenticator function; and implementing, in an authentication server, an authentication server function:

setting, in the subject, an authentication method layer of the subject, a peer layer of the subject, an encapsulation layer of the subject and a bottom layer of the subject; setting, in the authenticator, an authentication method layer of the authenticator, an authenticator layer of the authenticator, an encapsulation layer of the authenticator, a bottom layer of the authenticator and a transmission layer of the authenticator; and setting, in the authentication server, an authentication method layer of the authentication server, a peer layer of the authentication server, an encapsulation layer of the authentication server and a transmission layer of the authentication server; and implementing, in the authentication method layer of the subject, a function for carrying out, according to an authentication credential, authentication, and implementing, in the bottom layer of the subject, a function for transmitting data and for controlling, according to a result of the authentication, whether the subject accesses the authenticator; implementing, in the authentication method layer of the authenticator, a function for carrying out, according to an authentication credential, authentication, and implementing, in the bottom layer of the authenticator, a function for controlling, according to a result of the authentication, whether to permit the subject to access the authenticator; and implementing, in the authentication method layer of the authentication server, a function for carrying out, according to an authentication credential, authentication;

implementing, in the subject and the authenticator, an authentication protocol function:

implementing, in the authentication method layer of the subject together with the authentication method layer of the authenticator, the authentication protocol function;

implementing, by the subject and the authenticator, an authentication process:

sending, by the authentication method layer of the authenticator, a request message to the authentication method layer of the subject; and sending, by the authentication method layer of the subject, a response message to the authentication method layer of the authenticator to respond to a valid request message; and implementing, upon termination of the authentication, access control:

stopping sending, by the authentication method layer of the authenticator when being unable to authenticate the subject according to the response message, the request message and terminating message interaction, and notifying, by the authentication method layer of the authenticator, the bottom layer of the authenticator that the subject is not permitted to access the authenticator; or sending, by the authentication method layer of the authenticator, a failure message to the authentication method layer of the subject, and notifying, by the authentication method layer of the subject, the bottom layer of the subject that the subject is not permitted to access the authenticator; and stopping sending, by the authentication method layer of the authenticator when determining that the authentication is completed successfully according to the response message, the request message and terminating the message interaction, and notifying, by the authentication method layer of the authenticator, the bottom layer of the authenticator that the subject is permitted to access the authenticator; or sending, by the authentication method layer of the authenticator, a success message to the authentication method layer of the subject, and notifying, by the authentication method layer of the subject, the bottom layer of the subject that the subject is permitted to access the authenticator.

The request message sent by the authentication method layer of the authenticator to the authentication method layer of the subject contains a type field, which type field is a field used for indicating a type of the request message; and the response message sent by the authentication method layer of the subject to the authentication method layer of the authenticator contains a type field, which type field corresponds to the type field contained in the request message.

The above method may further includes the following step:

maintaining, as required, the interaction of sending the request message by the authentication method layer of the authenticator and responding to the request message by the authentication method layer of the subject.

The subject may be a terminal; the authenticator may be an access controller; and the authentication server may be a server.

Another technical solution of the present invention includes:

A peer-to-peer access control method of a triple-unit structure, which includes:

implementing, in a subject, a subject function; implementing, in an authenticator, an authenticator function; and implementing, in an authentication server, an authentication server function:

setting, in the subject, an authentication method layer of the subject, a peer layer of the subject, an encapsulation layer of the subject and a bottom layer of the subject; setting, in the authenticator, an authentication method layer of the authenticator, an authenticator layer of the authenticator, an encapsulation layer of the authenticator, a bottom layer of the authenticator and a transmission layer of the authenticator; and setting, in the authentication server, an authentication method layer of the authentication server, a peer layer of the authentication server, an encapsulation layer of the authentication server and a transmission layer of the authentication server; and implementing, in the authentication method layer of the subject, a function for carrying out, according to an authentication credential, authentication, and implementing, in the bottom layer of the subject, a function for transmitting data and for controlling, according to a result of the authentication, whether the subject accesses the authenticator; implementing, in the authentication method layer of the authenticator, a function for carrying out, according to an authentication credential, authentication, and implementing, in the bottom layer of the authenticator, a function for controlling, according to a result of the authentication, whether to permit the subject to access the authenticator; and implementing, in the authentication method layer of the authentication server, a function for carrying out, according to an authentication credential, authentication;

implementing, in the subject, the authenticator and the authentication server, an authentication protocol function:

implementing, in the authentication method layer of the subject together with the authentication method layer of the authenticator and together with the authentication method layer of the authentication server, the authentication protocol function;

implementing, by the subject, the authenticator and the authentication server, an authentication process:

sending, by the authentication method layer of the authenticator during the message interaction between the authentication method layer of the subject and the authentication method layer of the authenticator, a request message to the authentication method layer of the authentication server, and sending, by the authentication method layer of the authentication server, a response message to the authentication method layer of the authenticator; and implementing, upon termination of the authentication, access control:

stopping sending, by the authentication method layer of the authenticator when being unable to authenticate the subject according to the response message of the authentication method layer of the subject or according to the response message of the authentication method layer of the authentication server, the request message and terminating the message interaction, and notifying, by the authentication method layer of the authenticator, the bottom layer of the authenticator that the subject is not permitted to access the authenticator; or sending, by the authentication method layer of the authenticator, the failure message to the authentication method layer of the subject, and notifying, by the authentication method layer of the subject, the bottom layer of the subject that the subject is not permitted to access the authenticator; and stopping sending, by the authentication method layer of the authenticator when determining that the authentication is completed successfully according to the response message of the authentication method layer of the subject or according to the response message of the authentication method layer of the authentication server, the request message and terminating the message interaction, and notifying, by the authentication method layer of the authenticator, the bottom layer of the authenticator that the subject is permitted to access the authenticator; or sending, by the authentication method layer of the authenticator, the success message to the authentication method layer of the subject, and notifying, by the authentication method layer of the subject, the bottom layer of the subject that the subject is permitted to access the authenticator.

The request message sent by the authentication method layer of the authenticator to the authentication method layer of the subject contains a type field, which type field is a field used for indicating a type of the request message; and the response message sent by the authentication method layer of the subject to the authentication method layer of the authenticator contains a type field, which type field corresponds to the type field contained in the request message; and the request message sent by the authentication method layer of the authenticator to the authentication method layer of the authentication server contains a type field, which type field is a field used for indicating a type of the request message; and the response message sent by the authentication method layer of the authentication server to the authentication method layer of the authenticator contains a type field, which type field corresponds to the type field contained in the request message.

The above method may further include the following steps:

maintaining, as required, the interaction of sending the request message by the authentication method layer of the authenticator and responding to the request message by the authentication method layer of the subject; and maintaining, as required, the interaction of sending the request message by the authentication method layer of the authenticator and responding to the request message by the authentication method layer of the authentication server.

The subject may be a terminal; the authenticator may be an access controller; and the authentication server may be a server.

When implementing the method of the present invention in the network structure of a specific type, the authentication carried out by the terminal (subject) and the access controller (authenticator) needs assistance of the server. The terminal can communicate with the access controller and cannot communicate with the server, while the access controller can communicate with the terminal and can also communicate with the server. The terminal, the access controller and the server all participate in the authentication, and the trust relationship is established between the terminal and the access controller directly, which renders security very reliable.

In addition, the method of the present invention may be implemented in a triple-unit structure, but may be compatible to double-unit double-entity structure. In the case that there is no authentication server, the implementation of the method of the present invention is totally compatible to the double-unit double-entity network structure. Therefore, the method of the present invention may be implemented in both the double-entity and the triple-entity structure, which may have full adaptability to the existing network structures.

Besides, when implementing the method according to the present invention, the authentication protocol layer may use existing authentication protocols, or alternatively new authentication protocols may be devised.

Specifically: 1—terminal, 2—access control, 3—access controller, 4—network.

DETAILED DESCRIPTION OF THE EMBODIMENTS

First, the principles of the present invention are described as follows: An authentication protocol is a series of steps carried out by two or more participants to complete an authentication. The authentication method layers of the subject, the authenticator and the authentication server are the implementation of the authentication protocol in each of the participants, and they together construct an authentication protocol layer, so as to complete the authentication protocol function.

Figure 5:
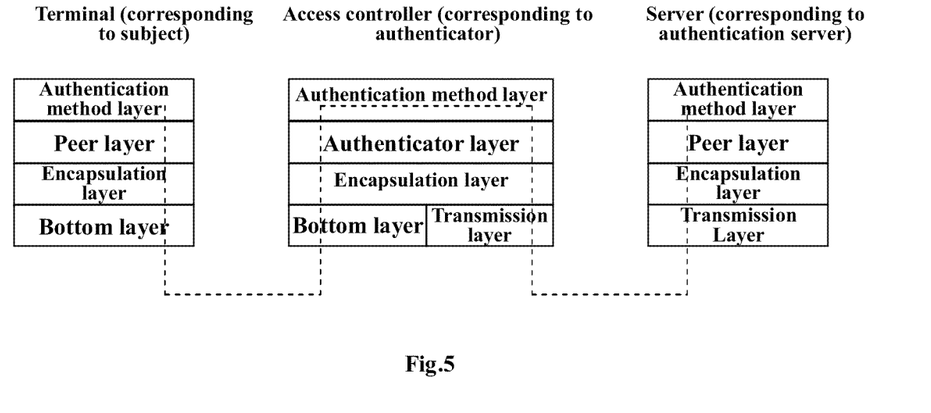
FIG. 5 a diagram illustrating a connection relationship of a triple-unit triple-entity structure in which the network peer-to-peer access control method of the present invention is implemented.

In the present invention, the functions of the terminal, the access controller and the server are adjusted, so that the access controller has an authentication credential and an authentication function, and the network structure is changed to triple-unit triple-entity. As shown in FIG. 5:

The first entity/the first unit: the terminal, which has an authentication credential, an authentication function, and a function for controlling whether to access the network.

The second entity/the second unit: the access controller, which has an authentication credential, an authentication function, and a function for controlling the access of the terminal according to the result of the authentication.

The third entity/the third unit: the server, which has an authentication credential and an authentication function.

In this structure, the authentication carried out by the terminal (subject) and the access controller (authenticator) needs assistance of the server (authentication server). The terminal can communicate with the access controller and cannot communicate with the server, while the access controller can communicate with the terminal and can also communicate with the server. The terminal, the access controller and the server all participate in the authentication, and the trust relationship is established between the terminal and the access controller directly, which renders security very reliable.

If only the subject and the authenticator is required to participate in the authentication protocol, the authentication method layer of the subject together with the authentication layer of the authenticator construct the authentication protocol layer, and complete the authentication protocol function together. If the server is required to participate in the authentication carried out by the subject and the authenticator, the authentication method layer of the subject together with the authentication layer of the authenticator and together with the authentication layer of the authentication server construct the authentication protocol layer, and complete the authentication protocol function together. They three may run the same authentication protocol. Alternatively, different authentication protocols may be run between any two of them. However there is essentially an association in the messages between those two of them, so that to achieve the same object, i.e. to complete the authentication between the subject and the authenticator.

In the art, the concepts of the bottom layer, the transmission layer, the encapsulation layer, the peer layer, the authenticator layer and the authentication method layer are as follows:

The bottom layer and the transmission layer: the bottom layer and the transmission layer are responsible for transmitting and receiving Triple-unit Extensible Authentication Protocol (TEAP) data frames between the peer and the authenticator. The transmission layer is a logic concept, which means that this layer may be of a technique different from that of the adjacent bottom layer.

The encapsulation layer: the encapsulation layer transmits and receives the TEAP data packets via the bottom layer, implements repeated-frame detection and retransmission, and transmits messages between the peer layer and the authenticator layer.

The peer layer and the authenticator layer: the encapsulation layer parses the TEAP data frames and transmits them to the peer layer or the authenticator layer. The peer layer and the authenticator layer parse the received data packets and transmit them to the peer layer or the authenticator layer.

The authentication method layer: the authentication method layer implements an authentication algorithm, and transmits messages via the peer layer and the authenticator layer.

Figure 4:
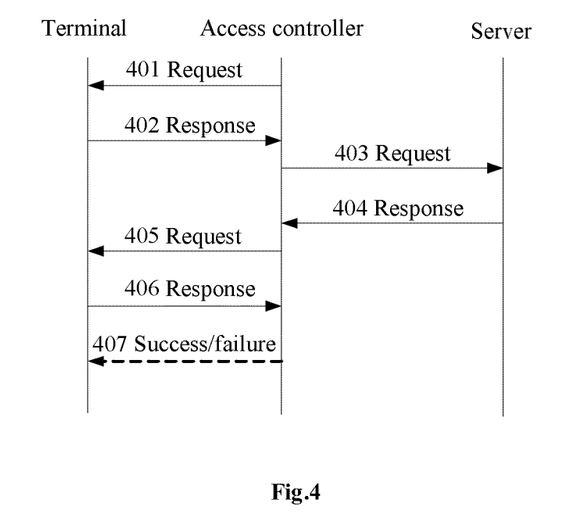
FIG. 4 is a flowchart illustrating a network peer-to-peer access control method of the present invention.

FIG. 4 is a flowchart illustrating a network peer-to-peer access control method of the present invention. Specifically, a subject function is implemented in the subject, an authenticator function is implemented in the authenticator, an authentication server function is implemented in the server; and a corresponding protocol of the authentication method is implemented in the terminal, the access controller and the server. The specific steps of the method according to the present invention are as follows:

401. The access controller sends a request message to the terminal to request starting authentication. The request message has a type field for indicating the type of the request. The type may be Identity, MD5-Challenge, etc.;

402. The terminal sends a response message to the access controller to respond to the valid request message. The response message contains a type field, which corresponds to the type field contained in the request message;

403. According to various authentication methods, the access controller sends a request message to the server if required;

404. The server sends a response message to the access controller. The sequence of the request message and the response message may be maintained for a required length;

405-406. The access controller sends a request message to the terminal, and the terminal sends a response message to the access controller, where the sequence of the request message and the response message may maintain interaction as required. Of course, according to various authentication methods, the terminal may possibly not respond to the request message sent by the access controller.

407. The session is maintained until the access controller cannot authenticate the terminal. The access controller may stop sending the request message and terminate the message interaction, and the access controller may send a failure message to the terminal and the access controller does not permit the terminal to access the access controller; or alternatively, the access controller may determine that a successful authentication has been completed, and the access controller may stop sending the request message and terminate the message interaction, or may send a success message to the terminal and the access controller permits the terminal to access the access controller. At this time, the access control between the terminal and the access controller is completed.

Figure 6:
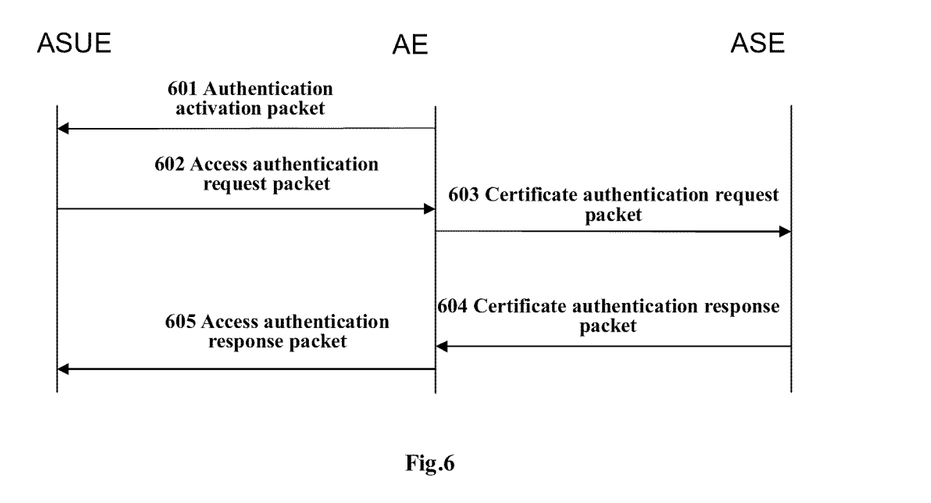
FIG. 6 is a flowchart illustrating the method of the present invention being implemented in a specific certificate authentication process.

An embodiment of the present invention is implemented in the model of the authentication method defined in the national standard GB15629.11-2003/XG1-2006. The certificate authentication process described in this standard is as shown in FIG. 6, and specifically includes the following:

In FIG. 6, the ASUE refers to the Authentication Supplicant Entity, i.e. the terminal, which implements the subject function; the AE refers to the Authenticator Entity, i.e. the access controller, which implements the authenticator function; and the ASE refers to the Authentication Service Entity, i.e. the server, which implements the authentication server function. The authentication method described in this standard needs to be implemented in all the ASUE, the AE and the ASE, which complies with and thus may be implemented in the model of the method according to the present invention. Specifically:

601. The AE sends a request message to the ASUE;

602. The ASUE sends a response message to the AE;

603. The AE sends a request message to the ASE;

604. The ASE sends a response message to the AE; and

605. The AE sends a request message to the ASUE; the ASUE receives the request message, and does not need to send a response message; and the AE stops sending messages.

For the definitions of the specific fields contained in the message, reference can be made to the definitions in the national standard GB15629.11-2003/XG1-2006.

Another embodiment of the present invention may be implemented in the Otway-Rees protocol, referring to Otway, D. and Ress, O., "Efficient and timely mutual authentication"

ACE OSR, Vol. 21, No. 1, pp. 8-10, January 1987. This protocol is used for identity authentication, and cannot be used in conventional network structures. Specific steps with the method of the present invention cooperating with this protocol are as follows:

The participants include Alice, Bob and Trent.

1] Bob sends a request message to request starting authentication;

2] Alice generates a piece of message, which includes an index number, her identity, Bob's identity and a random number, and encrypts this piece of message using the shared key of her and Trent, and then sends the ciphertext together with the index number, the identities of Alice and Bob to Bob;

3] Bob generates a piece of message, which includes a new random number, an index number, the identities of Alice and Bob, and encrypts this piece of message using the shared key of him and Trent, and then sends the ciphertext together with the ciphertext of Alice, the index number, and the identities of Alice and Bob to Trent;

4] Trent generates a random session key, and then generates two pieces of messages. The first piece of message is to encrypt the random number of Alice and the session key using the shared key of him and Alice. The second piece of message is to encrypt the random number of Bob and the session key using the shared key of him and Bob. Finally, Trent sends the two pieces of messages together with the index numbers to Bob;

5] Bob sends the piece of message belonging to Alice as well as the index number to Alice; and 6] If all the random numbers are matched and the index number is not changed during the communication process, the authentication succeeds.

It can be seen that Alice, Bob and Trent respectively implement the subject, the authenticator and the authentication server functions, and this authentication protocol can be implemented in the method of the present invention.

To sum up, when implementing the method of the present invention in the network structure of a specific type, the authentication carried out by the terminal (subject) and the access controller (authenticator) needs assistance of the server. The terminal can communicate with the access controller and cannot communicate with the server, while the access controller can communicate with the terminal and can also communicate with the server. The terminal, the access controller and the server all participate in the authentication, and the trust relationship is established between the terminal and the access controller directly, which renders security very reliable.

In addition, the method of the present invention may be implemented in a triple-unit structure, but may be compatible to double-unit double-entity structure. With comparison with FIGS. 2 and 5, it is known that in the case that there is no authentication server, the implementation of the method of the present invention is totally compatible to the double-unit double-entity network structure. Therefore, the method of the present invention may be implemented in both the double-entity and the triple-entity structure, which may have full adaptability to the existing network structures.

Besides, when implementing the method according to the present invention, the authentication protocol layer may use existing authentication protocols, or alternatively new authentication protocols may be devised.

The above embodiments are employed to describe and explain the principles of the present invention. It can be understood that the specific embodiments of the present invention are not limited to those above. Various variations and modifications devised by those skilled in the art without departing from the substance and scope of the present invention are all encompassed within the scope of the present invention. Therefore, the scope of the present invention is defined by the appended claims.

What is claimed is:

1. A peer-to-peer access control method of a triple-unit structure, comprising:

implementing, in a subject, a subject function; implementing, in an authenticator, an authenticator function; and implementing, in an authentication server, an authentication server function:

setting, in the subject, an authentication method layer of the subject, a peer layer of the subject, an encapsulation layer of the subject and a bottom layer of the subject; setting, in the authenticator, an authentication method layer of the authenticator, an authenticator layer of the authenticator, an encapsulation layer of the authenticator, a bottom layer of the authenticator and a transmission layer of the authenticator; and setting, in the authentication server, an authentication method layer of the authentication server, a peer layer of the authentication server, an encapsulation layer of the authentication server and a transmission layer of the authentication server; and implementing, in the authentication method layer of the subject, a function for carrying out, according to an authentication credential, authentication, and implementing, in the bottom layer of the subject, a function for transmitting data and for controlling, according to a result of the authentication, whether the subject accesses the authenticator; implementing, in the authentication method layer of the authenticator, a function for carrying out, according to an authentication credential, authentication, and implementing, in the bottom layer of the authenticator, a function for controlling, according to a result of the authentication, whether to permit the subject to access the authenticator; and implementing, in the authentication method layer of the authentication server, a function for carrying out, according to an authentication credential, authentication;

implementing an authentication protocol function, comprising:

implementing, in the authentication method layer of the subject together with the authentication method layer of the authenticator and together with the authentication method layer of the authentication server, the authentication protocol function;

implementing an authentication process, comprising:

sending, by the authentication method layer of the authenticator, a request message to the authentication method layer of the subject; and sending, by the authentication method layer of the subject, a response message to the authentication method layer of the authenticator to respond to a valid request message;

sending, by the authentication method layer of the authenticator, a request message to the authentication method layer of the authentication server, and sending, by the authentication method layer of the authentication server, a response message to the authentication method layer of the authenticator, so that the authentication server authenticates the authenticator; and authenticating the authentication server by the subject through the message interaction between the subject and the authenticator together with the message interaction between the authenticator and the authentication server; and implementing, upon termination of the authentication, access control, comprising:

carrying out at least one of following steps: stopping the sending the request message and terminating message interaction, by the authentication method layer of the authenticator when being unable to authenticate the subject according to at least one of the response message of the authentication method layer of the subject and the response message of the authentication method layer of the authentication server, and notifying, by the authentication method layer of the authenticator, the bottom layer of the authenticator that the subject is not permitted to access the authenticator; and sending, by the authentication method layer of the authenticator, a failure message to the authentication method layer of the subject, and notifying, by the authentication method layer of the subject, the bottom layer of the subject that the subject is not permitted to access the authenticator; and carrying out at least one of following steps: stopping the sending the request message and terminating the message interaction, by the authentication method layer of the authenticator when determining that the authentication is completed successfully according to at least one of the response message of the authentication method layer of the subject and the response message of the authentication method layer of the authentication server, and notifying, by the authentication method layer of the authenticator, the bottom layer of the authenticator that the subject is permitted to access the authenticator; and sending, by the authentication method layer of the authenticator, a success message to the authentication method layer of the subject, and notifying, by the authentication method layer of the subject, the bottom layer of the subject that the subject is permitted to access the authenticator.

2. The peer-to-peer access control method of a triple-unit structure according to claim 1, wherein the request message sent by the authentication method layer of the authenticator to the authentication method layer of the subject contains a type field, which type field is a field used for indicating a type of the request message; and the response message sent by the authentication method layer of the subject to the authentication method layer of the authenticator contains a type field, which type field corresponds to the type field contained in the request message.

3. The peer-to-peer access control method of a triple-unit structure according to claim 1, further comprising:
maintaining, as required, the interaction of sending the request message by the authentication method layer of the authenticator and responding to the request message by the authentication method layer of the subject.

4. The peer-to-peer access control method of a triple-unit structure according to claim 1, wherein the request message sent by the authentication method layer of the authenticator to the authentication method layer of the subject contains a type field, which type field is a field used for indicating a type of the request message; and the response message sent by the authentication method layer of the subject to the authentication method layer of the authenticator contains a type field, which type field corresponds to the type field contained in the request message; and the request message sent by the authentication method layer of the authenticator to the authentication method layer of the authentication server contains a type field, which type field is a field used for indicating a type of the request message; and the response message sent by the authentication method layer of the authentication server to the authentication method layer of the authenticator contains a type field, which type field corresponds to the type field contained in the request message.

5. The peer-to-peer access control method of a triple-unit structure according to claim 1, further comprising:
maintaining, as required, the interaction of sending the request message by the authentication method layer of the authenticator and responding to the request message by the authentication method layer of the subject; and
maintaining, as required, the interaction of sending the request message by the authentication method layer of the authenticator and responding to the request message by the authentication method layer of the authentication server.

6. The peer-to-peer access control method of a triple-unit structure according to claim 1, wherein the subject is a terminal; the authenticator is an access controller; and the authentication server is a server.

7. The peer-to-peer access control method of a triple-unit structure according to claim 2, further comprising:
maintaining, as required, the interaction of sending the request message by the authentication method layer of the authenticator and responding to the request message by the authentication method layer of the subject.

8. The peer-to-peer access control method of a triple-unit structure according to claim 4, further comprising:
maintaining, as required, the interaction of sending the request message by the authentication method layer of the authenticator and responding to the request message by the authentication method layer of the subject; and
maintaining, as required, the interaction of sending the request message by the authentication method layer of the authenticator and responding to the request message by the authentication method layer of the authentication server.

9. The peer-to-peer access control method of a triple-unit structure according to claim 1, wherein the subject is a terminal; the authenticator is an access controller; and the authentication server is a server.

10. The peer-to-peer access control method of a triple-unit structure according to claim 1, wherein the subject is capable of communicating authentication protocol with the authenticator and is not capable of communicating authentication protocol with the authentication server, while the authenticator is capable of communicating authentication protocol with the subject and is also capable of communicating authentication protocol with the authentication server; the subject, the authenticator and the authentication server all participate in the authentication, and a trust relationship is established between the subject and the authenticator directly.

* * * * *

UNITED STATES PATENT AND TRADEMARK OFFICE
CERTIFICATE OF CORRECTION

| | |
|---|---|
| PATENT NO. | : 8,495,712 B2 |
| APPLICATION NO. | : 12/519955 |
| DATED | : July 23, 2013 |
| INVENTOR(S) | : Xiaolong Lai et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this
Sixth Day of May, 2014

Michelle K. Lee
*Deputy Director of the United States Patent and Trademark Office*